UNITED STATES PATENT OFFICE.

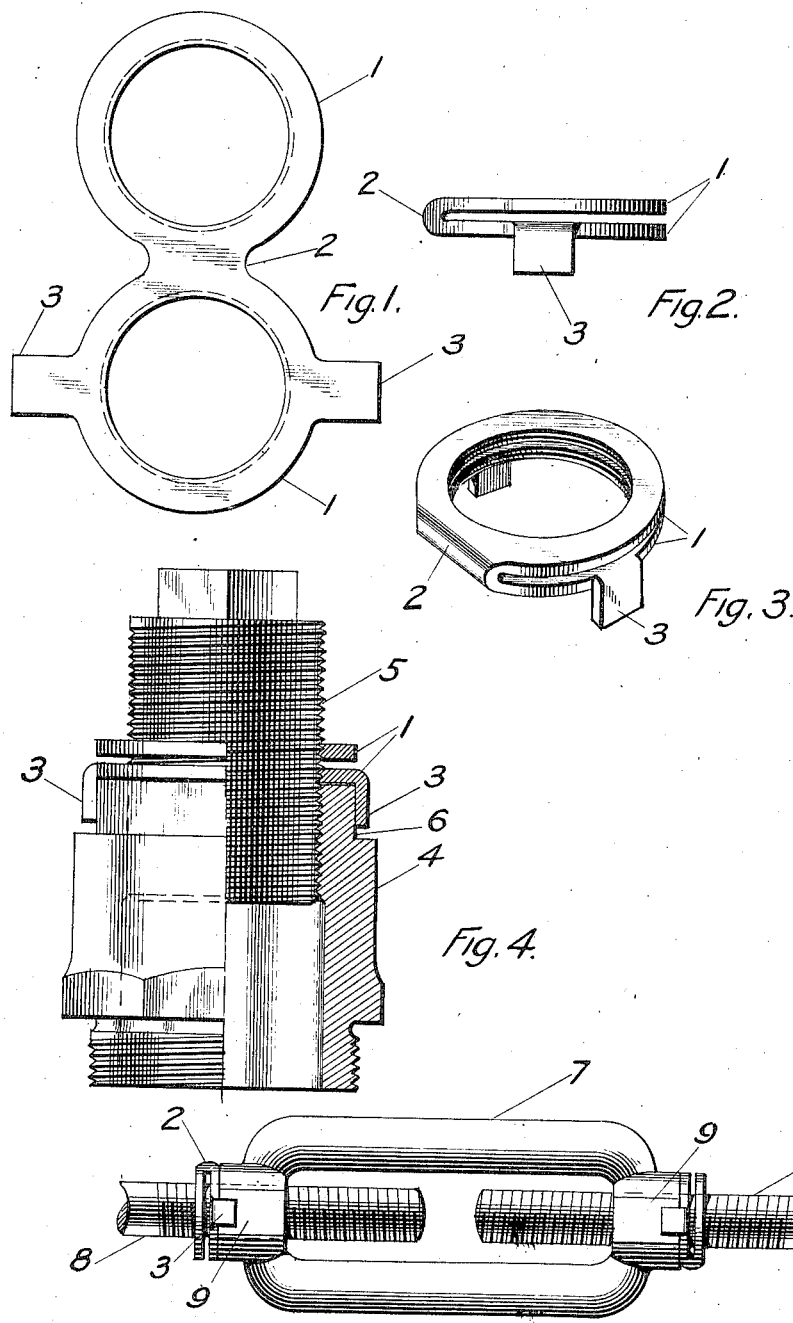

WILLIAM F. BONNESS, OF MADISON, WISCONSIN.

NUT-LOCK.

1,039,017.  Specification of Letters Patent.  Patented Sept. 17, 1912.

Application filed August 14, 1911. Serial No. 643,976.

*To all whom it may concern:*

Be it known that I, WILLIAM F. BONNESS, a citizen of the United States, residing at Madison, in the county of Dane and State of Wisconsin, have invented certain new and useful Improvements in Nut-Locks, of which the following is a specification.

My invention relates to nut locks of the type in which a member distinct from the nut is placed in positive engagement therewith and enters into frictional engagement with the bolt to prevent relative rotation of the bolt and nut.

The lock in its preferred form consists of a folded plate having substantially coaxial threaded openings, one in each leaf, the diameter and threads of the openings being the same as those of the nut to be locked. When free, the leaves maintain such relation that the threads of the two are slightly out of parallel, whence it follows that in the act of screwing the lock onto a threaded stem or shank its connecting web or fold is stressed, and the threads are caused to exert a binding friction upon those of the stem. One leaf is provided with a lug or equivalent, (one or more) to engage the main nut and to prevent rotation thereof except upon application of force sufficient also to overcome the friction of the lock.

The preferred embodiment of the device is illustrated in the accompanying drawings in which:—

Figure 1 is a plan view of the blank from which the nut is made; Fig. 2 is a side elevation of a completed nut; Fig. 3 is a perspective view of the same; Fig. 4 is a view partly sectional showing the lock applied to a grease cup; and Fig. 5 is an elevation showing it applied to a turnbuckle.

The blank is preferably a stamping consisting of two ring portions 1, connected by a web or strip 2, one of the ring portions having one or more lugs 3. The blank is bent through the web 2 until the ring portions 1 are substantially parallel and slightly spaced apart as in Fig. 2. The lugs 3 are bent down at right angles to the plane of the ring 1 on which they are formed. The bore of the nut is then tapped while the two ring portions are sprung from their normal relative positions, or else the two ring portions are bent toward or from each other after the tapping is completed, so that in either case the threads in the two portions are slightly out of register, and the nut may hence exert a resilient clamping action on the threads of the bolt to which it is applied.

In use the lock nut is laid upon any ordinary nut so that the lugs 3 engage the flats of the nut and the two are then turned onto the bolt. The engagement of the lugs 3 on the lock nut with the flats of the ordinary nut compels the two to turn together so that the frictional engagement of the lock nut with the bolt prevents the other nut from backing off.

In Fig. 4 the device is shown applied to a grease cup 4 having a threaded plug 5. Here the lugs 3 engage flats 6 on the cup 4 and prevent the lock nut from turning on the cup. The clamping action of the lock nut on the plug prevents the latter from backing out and yet is not so great as to prevent its being turned by a wrench.

In Fig. 5 the device is shown applied to a turnbuckle having a nut or sleeve 7 threaded on rods 8. In this case the lugs 3 engage flats 9 on the sleeve 7 so as to cause the lock nuts to turn with the sleeve and by their frictional engagement with the rods 8 to prevent undesired turning of the nut or sleeve.

Obviously the lock nut is applicable to a large variety of threaded members, and requires merely the formation of flat portions or recesses on the nut to hold the lugs 3. It requires no adjustment and is turned as the nut is turned so that it requires no special manipulation.

Obviously changes may be made from the exact form and mode of manufacture set forth above without departing from the spirit of my invention.

It will be noted that in operation the lock is attached to the nut and exerts a frictional action upon the bolt, and it is immaterial whether the nut be held stationary and the bolt turned therein, as in the case of the grease-cup, or whether the bolt be held stationary and the nut turned thereon, as in the case of the turn buckle or ordinary bolt and nut.

Having thus described the invention, what I claim is:

1. A nut lock, consisting of a folded plate, the two leaves of which are provided with substantially coaxial threaded openings, and one of which is provided with a lug to engage the nut to be locked, the diameter and threads of the openings corresponding with those of such nut, and said leaves when free maintaining such relation as to hold the threads of the two slightly out of parallel.

2. A nut lock comprising two substantially parallel leaves connected by a resilient web, said leaves having substantially coaxial threaded openings of diameter and pitch corresponding to those of the nut to be locked, said yielding web tending to hold the threads of the two leaves out of normal relation, and one of said leaves being provided with a lug to engage such nut.

3. A nut lock consisting of two substantially parallel leaves connected by a resilient web or fold, said leaves having threads normally displaced slightly from true relative pitch, whereby, when the lock is screwed upon a stem the connecting web will be stressed and the threads of the lock will be caused to exert an elastic friction upon those of the stem, said lock being provided with means for engaging the nut to be locked, whereby independent rotation is prevented.

In testimony whereof I have signed my name to this specification in the presence of two subscribing witnesses.

WILLIAM F. BONNESS.

Witnesses:
CHAS. O'NEILL,
CHAS. W. JONES.